United States Patent [19]

Kurz

[11] 4,013,095

[45] Mar. 22, 1977

[54] REGULATOR DEVICE FOR CONTROLLING THE FLOW OF A LIQUID

[76] Inventor: Reinhard Kurz, Hauptstrasse 6, 6369 Nidderau 3, Germany

[22] Filed: Feb. 3, 1975

[21] Appl. No.: 546,772

Related U.S. Application Data

[63] Continuation-in-part of Ser. No. 390,226, Aug. 21, 1973, Pat. No. 3,906,978.

[30] Foreign Application Priority Data

Aug. 22, 1972 Germany .......................... 2241215
Feb. 5, 1974 Germany .......................... 2405303

[52] U.S. Cl. .................................. 137/599; 137/78
[51] Int. Cl.² ........................................ A01G 25/00
[58] Field of Search ............... 47/38, 38.1, 48.5; 239/63, 64; 137/78, 154, 576, 593, 599; 61/12, 13

[56] References Cited

UNITED STATES PATENTS 1,710,362  4/1929  Korneff .............................. 61/13
3,856,205  12/1974  Rohling .............................. 239/63

*Primary Examiner*—Martin P. Schwadron
*Assistant Examiner*—Richard Gerard

[57] ABSTRACT

A regulator device for controllably supplying liquid to a suction means, and having a gate that is adjustable to selectively block and unblock inflow conduits extending into a chamber, such that liquid outside the chamber flows into the chamber through a designated inflow conduit. The inflow conduits have outlets at different heights, the outlet height of each inflow conduit corresponding to the magnitude of suction required to draw liquid from the chamber through an outflow conduit having an inlet below a liquid level in the chamber.

7 Claims, 5 Drawing Figures

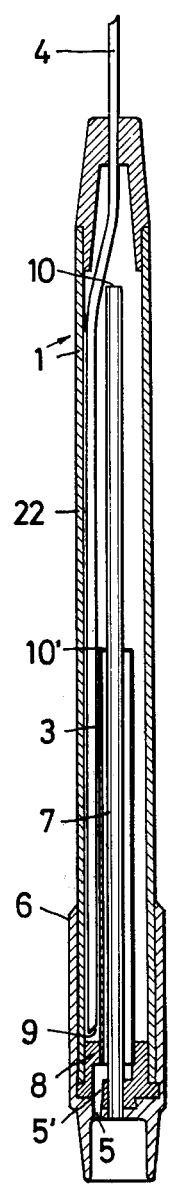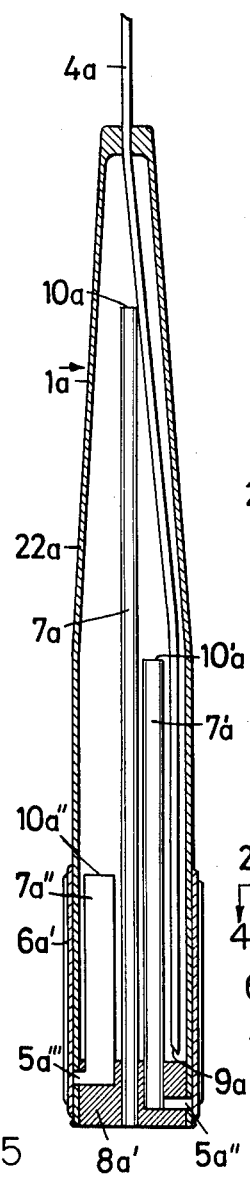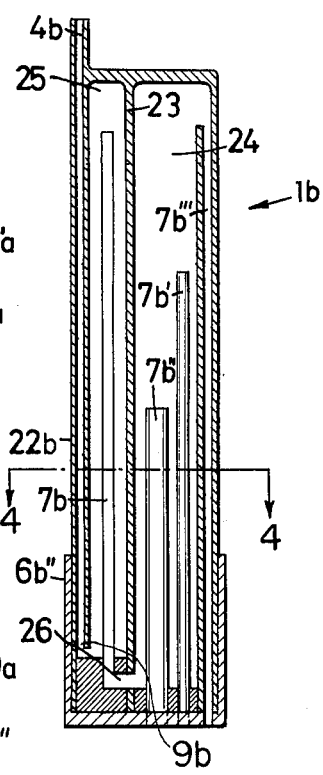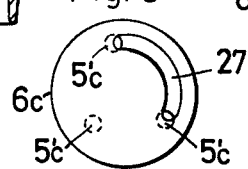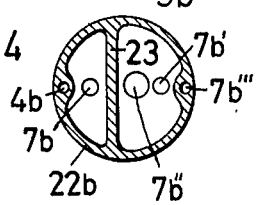

REGULATOR DEVICE FOR CONTROLLING THE FLOW OF A LIQUID

This application is a continuation-in-part of my copending U.S. Pat. application Ser. No. 390,226 filed Aug. 21, 1973 and now Pat. No. 3,906,978.

BACKGROUND AND SUMMARY OF THE INVENTION

This invention relates in general to regulator devices for controlling the flow of liquid and more particularly to an adjustable regulator for controlling the supply of water to a suction device.

My prior application Ser. No. 390,226 discloses a device for controllably supplying a liquid to a porous medium to maintain a given degree of humidification therein, which device includes a regulator which is operable to establish a pressure differential opposing that established by a capillary means which infuses liquid into the medium. Such regulator is so designed that its opposing pressure differential counterbalances the suction pressure differential created by the capillary means at the degree of humidification to be maintained, thereby cutting off the further flow of liquid to the medium as would tend to raise the humidity thereof. Upon drying of the medium, the capillary means creates a greater suction pressure which causes a resumption of liquid flow through the regulator until the increased humidity produced again results in a counterbalance condition of the regulator and flow stoppage.

The opposing pressure differential created by the regulator described in the aforesaid prior application was generally fixed by the elevation difference between the inlet of one conduit and the outlet of another conduit, and the effective gas column heights of one or more gas spaces above liquid levels in the regulator housing. With such regulator structure the pressure differential setting could not easily be changed to a selected one of a plurality of preset values.

Because the primary application of this invention is the automatic watering of plants, it is important to provide a regulator suitable for controlling the humidity of soil used for different types of plants. Certain plants, for example, like cacti, need only a slight watering and their soil need be maintained at a relatively low humidity, whereas other plants, like swamp plants, can grow only in very moist soil. It, therefore, is advantageous to provide a regulator apparatus in which the pressure differential setting can be easily changed to values corresponding to new soil humidification levels.

The invention provides a regulator device in which the degree of suction pressure required to draw liquid, such as water, from a chamber can be selectively regulated.

According to the invention, this problem will be solved in that in the regulation apparatus of the type described in the application, several different long supply conduits and, respectively, or several flow conduits all having the same volume, but predetermined by assorted highly-placed mouths in a closed chamber, are selectively adjustable and effective.

The subject matter of this invention can be realized in several ways. It can, for example, be practical to place two or more chambers next to each other, of which the first few flow conduits with the highly-placed assorted mouths are comprised, while the second chamber is comprised of an air route like that described in the application, whereby the supply conduit of the first chamber is suitable for use as the flow conduit of the second chamber. There could also be two or more chambers arranged next to each other in the shaft, each of which is provided with several flow conduits.

There are different principles of arrangement also for the storing of the flow conduits of the outwardly-closed air route in the shaft of the apparatus. It is advantageous, for reasons of saving space, to arrange the flow conduits inside each other.

A somewhat larger space requirement presents itself with simple manner of mounting if the flow conduits are arranged next to each other with parallel axes.

In order to effect the adjustment, it is preferable to provide a closure member that insures that the desired flow conduits are always open or in operation, while the others are either closed or inoperative.

The openings of the adjustable closure mechanism are advantageously fitted to each other so that at least one of the openings stays open in each place, in order to prevent the liquid flow from becoming completely cut off due to faulty operation.

The closure or gate mechanism can contain two directly opposable rotatable parts in a preferred embodiment which is provided by the required throughway openings for the water. The embodiment can also be effected so that the closure mechanism contains two directly opposable shiftable parts in axial directions that are provided by the desired throughway openings. In order to prevent the flow of water from being totally shut off, it is possible even in the simplest case to keep the flow conduit with the highest-placed mouth constantly open. Finally, let one or several flow conduits, or, respectively, the supply conduits form themselves into the wall of the shaft, so that they form together one plastic unitary structure, whereby the conduits are connected by side openings to the room involved.

The adjusting apparatus has the advantage that it can be adjusted to the desired degree of moisture of the plant pot soil or the ground in very simple manner, whereby, however, the operation of the apparatus, especially the filling of the apparatus with water, exactly as in the apparatus described in my prior application Ser. No. 390,226, can be carried out independently of the adjustment, so that the volume of the different gradated flow conduits are identical to each other.

In general, the invention provides a regulator device for controllably supplying a liquid to a suction means, which comprises an enclosed chamber, an outflow conduit extending into said chamber to deliver liquid therefrom to said suction means, a plurality of inflow conduits extending within said chamber, and adjustable gate means operable to selectively block and unblock at least one of said inflow conduits to direct liquid outside the chamber to flow into the chamber through a corresponding inflow conduit, said outflow conduit having an inlet below a liquid level location in said chamber, each of said inflow conduits having an outlet at a different height above said liquid level location in said chamber the outlet height of each inflow conduit corresponding to the magnitude of the suction pressure required to draw liquid from the chamber through the outflow conduit when liquid flows into the chamber through that inflow conduit.

For a better understanding of the invention, reference should be had to the following detailed description and accompanying drawings which exemplified certain preferred embodiments of the invention.

BRIEF DESCRIPTION OF THE DRAWINGS

In the drawing:

FIG. 1 is an elevation view, partly in section, of a regulator apparatus according to a preferred embodiment of the invention and featuring a rotatable gate means.

FIG. 2 is a elevation view, partly in section, of a regulator apparatus according to another embodiment of the invention.

FIG. 3 is an elevation view, partly in section, of a regulator apparatus according to a further embodiment of the invention.

FIG. 4 is a traverse sectional view of the regulator apparatus shown in FIG. 3 as taken along line 4—4 therein.

FIG. 5 is a schematic view of a typical rotatable gate means that can be used in the practice of the invention.

DESCRIPTION OF PREFERRED EMBODIMENTS OF THE INVENTION

In each of FIGS. 1, 2 and 3 there is shown a regulator device for controllably supplying a liquid, such as water, to a suction means (not shown) such as a capillary action feeder that infuses the liquid into a porous soil medium to maintain a certain humidity therein. Each regulator device basically has an enclosed chamber or housing 1, 1a, 1b which include an elongated hollow shaft 22, 22a, 22b giving the device the appearance somewhat of a fountain pen. The device is normally operated in the upright position as shown in FIGS. 1–3, with the lower portion of the device being set into a water supply reservoir as indicated in my prior application Ser. No. 390,226, and a liquid level being pre-established within the chamber somewhat just above the inlet 9, 9a, 9b of an outflow conduit 4, 4a, 4b that extends downwardly into the chamber 1, 1a, 1b to deliver liquid therefrom to the suction means. For such purpose, the conduit 4, 4a, 4b extends away from the regulator device and is flow-connected with the suction means.

Accordingly, for purposes of describing this invention it should be understood that the conduit 4, 4a, 4b is filled with liquid and this liquid is at a suction pressure level created by the suction means and which tends to draw liquid from chamber 1, 1a, 1b up through conduit 4, 4a, 4b.

In the FIG. 1 regulator there are provided a pair of inflow conduits, a pipette 3 and an inner tube 7 extending up through and above the pipette 3. Inflow conduits 3 and 7 extend within the normally gas or air filled space of the chamber 1 and have outlets 10' and 10 respectively at different heights above the liquid level location in the chamber 1. The outlet height of each inflow conduit 3, 7 corresponds to the magnitude of the suction pressure required to draw liquid from the chamber 1 when liquid from the reservoir (not shown) flows into the chamber 1 through that particular conduit 3 or 7.

It should be noted that the conduit 7 having the higher outlet 10 is permanently open to allow liquid flow into the chamber, although this does not occur if the conduit 3 is open, because the lower position of the conduit 3 outlet 10' causes liquid to pour from such outlet 10' at a lower suction pressure than is required to raise the liquid up to the level of outlet 10 of conduit 7.

Cylindrical shaft 22 is hollow inside and is conveyed airtight through, or set airtight into the upper end of the shaft. Shaft 22 is connected at its bottom end with a cartridge-shaped gate body 6, in which bottom end a conduit, for example hose 7, is set airtight in. The shaft 22 fits in the cartridge 6 and is airtightly connected with it. In the bottom part of the cartridge 6 is found a closure member 8, which is tightly connected with shaft 22, while the cartridge 6 is rotatable relative to the shaft and opposed to the closure member 8. In the cartridge 6 is found beside the opening for the hose 7 a further throughway opening 5, that, along with a matching opening 5' in the closure member 8, takes cover only in a specific position of the cartridge 6. A channel is connected through the openings 5 and 5' to the inside of a pipette 3 that is, however, only half as high as the conduit 7, the volume of which, minus the volume of the conduit, is approximately the same as the inner volume of the conduit 7.

The inlet 9 of the conduit 4 is deeper in chamber 1 than outlet 10 of conduit 7, and also deeper than outlet 10' of pipette 3. Before use of the regulation apparatus, i.e. before it is filled with water and is set in the water container, the cartridge 6 can either be adjusted so that the throughway channel 5, 5' is closed, or so that it is open. If it is open, the sucking-up of the water is easier and more water flows out through conduit 4, because of the smaller difference of height between mouths 9 and 10'. With a closed opening 5, 5', a stronger sucking pressure is needed, in order to let the water out of the mouth 10 of the conduit 7.

The artisan will therefore appreciate that the invention provides an adjustable gate means 6 operable to selectively block at least one of the inflow conduits 3 and 7, to direct liquid outside the chamber 1 to flow into the chamber through a corresponding conduit 3 or 7.

In the case of the FIG. 1 embodiment, the gate means 6 is rotatable relative to the chamber 1 and has an aperture 5 disposed for registry in flow communication with a flow path 5' associated with a corresponding inflow conduit 3 when the gate means is in a predetermined angular position as shown in FIG. 1.

In the embodiment according to FIG. 2 are provided in the shaft 22a of the regulation apparatus, besides the conduit 4a as outflow conduit, three inflow conduits 7a, 7a', and 7a", with volumes identical to each other and whose outlets 10a, 10a' and 10a" are at different heights.

The closure gate mechanism is found in this case in an axially shiftable cap 6a' that can be shifted directly opposed to a closure member 8a', which is, on its side, connected to the shaft 22a. In the closure member 8a' channels 5a" and 5a''' are provided which come into contact with the liquid in a reservoir-type container when the cap 6a' is shifted upwards. The connection can also be established by corresponding side openings in the cap 6a'.

During operation, the shortest flow conduit 7a" is actually working, because the liquid is by the lowest pressure sucked through it, while the conduits 7a' and 7a are workable only with higher pressure.

Accordingly, the FIG. 2 embodiment has a gate means 6a' that is slidable along the chamber 1a, and still at least one, but here two of the inflow conduits 7a', 7a" each has an associated flow passage 5a", 5a''' opening at the side of the chamber and positioned for selective blocking and unblocking by gate means 6a' according to the position thereof. Consequently, the FIG. 2 regulator has three selectable suction pressure settings whereas the FIG. 1 regulator has only two settings.

In the embodiment according to FIG. 3, two chamber compartments 24 and 25 are arranged next to each other in the shaft 22b, which compartments are separated by a wall 23. The one compartment 24 contains several inflow conduits 7b', 7b'', and 7b''', while the second compartment 25 only has a flow conduit 7b. This arrangement can also be changed so that both compartments in the regulator have several flow conduits which would be similar to conduits 7b', 7b'', and 7b'''. In this example, the outflow conduit 4b of the compartment 25 and the inflow conduit 7b''' of the compartment 24 are formed into the wall of the chamber. The conduit 7b of the compartment 25 can be open towards the bottom in the neighborhood of the bridge passage 26. The cartridge 6b'' selectively opens and closes the inflow conduit.

FIG. 4 shows, in cross-section of FIG. 3 how the flow conduits are set up in the compartments. The outflow conduit 4b and the inflow conduit 7b''' are, in this case, not formed as hoses, but rather as conduits formed into the wall of the shaft 22.

FIGS. 3 and 4 therefore exemplify a regulator device wherein the chamber has a plurality of separated compartments 24, 25 communicated in series by liquid trap flow path means 26 accommodating the maintenance within each compartment of a gas space above the liquid level therein. In such case, the outflow conduit 4b extends into the last in the series of compartments 24, 25 whereby the magnitude of the suction pressure required to draw liquid from the chamber through conduit 4 corresponds to the sum of the effective gas column heights in the compartments 24, 25 as determined by the outlet height of the inflow conduit 7b' or 7b'' or 7b''' through which liquid actually flows into the chamber. Which conduit 7b', 7b'' or 7b''' is at any given time the conduit delivering liquid into the chamber, is determined by the setting of the cartridge or cap type gate means 6b'' fitted over the lower end of the chamber.

FIG. 5 shows schematically a typical rotatable gate means 6c which operates similarly to the gate means 6 of the FIG. 1 embodiment, but which is adaptable for operation with plural inflow conduits (not shown) similar to conduit 7 in FIG. 1 to the extent of having a respectively associated passage 5'c that is similar to passage 5' extending through closure member 8. In the example represented by FIG. 5, the gate means 6c has an arcuate slot opening 27 which functions similarly to the opening 5 in gate means 6, and the opening 27 extends such that at least one passage 5'c of the three equally spaced passages 5'c shown is exposed for inflow of liquid through opening 27. Thus regardless of the angular position of gate means 6c, there will be at least one inflow conduit properly supplied with liquid.

The gradation and adjustability of the supply conduit is feasible in like manner to the described gradation and adjustability of the flow conduits.

The openings in the cap 6 or 6b'' can preferably be arranged so that all of them are lying on a common circular line and are the same distance from a center of rotation, and open and close upon the rotation of the cap 6, 6b''.

It is however possible to change the arrangement so that the openings are at different distances from the central point and still open and close upon the rotation of the cap.

From the foregoing, it can be understood that the invention is capable of numerous modifications and variations that should become apparent to the artisan from a reading hereof.

What is claimed is:

1. A regulator device for controllably supplying a liquid to a suction means which comprises an enclosed chamber, an outflow conduit extending into said chamber to deliver liquid therefrom to said suction means, a plurality of inflow conduits extending within said chamber, and adjustable gate means operable to selectively block and unblock at least one of said inflow conduits to direct liquid outside the chamber to flow into the chamber through a corresponding inflow conduit, said outflow conduit having an inlet below a liquid level location in said chamber, each of said inflow conduits having an outlet at a different height above said liquid level location in said chamber, the outlet height of each inflow conduit corresponding to the magnitude of the suction pressure required to draw liquid from the chamber through the outflow conduit when liquid flows into the chamber through that inflow conduit.

2. A regulator device according to claim 1 wherein said gate means is rotatable relative to said chamber and has an aperture disposed for registry in flow communication with a flow path associated with a corresponding inflow conduit when said gate means is in a predetermined angular position.

3. A regulator device according to claim 1 wherein said gate means is slidable along said chamber, and at least one of said inflow conduits has an associated flow passage opening at the side of said chamber and positioned for selective blocking and unblocking by said gate means according to the position thereof.

4. A regulator device according to claim 1 wherein said chamber has a plurality of separated compartments communicated in series by liquid trap flow path means accommodating the maintenance within each compartment of a gas space above said liquid level, said outflow conduit extending into the last in the series of said compartments whereby the magnitude of suction pressure required to draw liquid from the chamber through the outflow conduit corresponds to the sum of the effective gas column heights in said compartments as determined by the outlet height of the inflow conduit through which liquid flows into the chamber.

5. A regulator device according to claim 1 wherein the inflow conduit having the highest outlet is permanently open to allow flow therethrough of said liquid outside the chamber.

6. A regulator device according to claim 1 wherein said gate means is in the form of a cap fitted over the lower end of said chamber and having at least one aperture facing said lower end.

7. A regulator device according to claim 1 wherein said inflow conduits are arranged in generally parallel relation within said chamber.

* * * * *